United States Patent [19]
Evans

[11] Patent Number: 5,691,526
[45] Date of Patent: Nov. 25, 1997

[54] MAGNETIC CARD READER ASSEMBLY HAVING A FIRST MEMBER THAT HAS A FIRST LEG INTEGRALLY CONNECTED TO A SIDE WALL OF THE GUIDE SLOT

[75] Inventor: William James Evans, San Francisco, Calif.

[73] Assignee: U.S. Order, Inc., Herndon, Va.

[21] Appl. No.: 472,999

[22] Filed: Jun. 7, 1995

[51] Int. Cl.$^6$ .................................................. G06K 7/08
[52] U.S. Cl. .......................... 235/449; 235/482; 235/485; 235/493; 360/2; 360/104
[58] Field of Search .................. 235/449, 482, 235/483, 484, 485, 493; 360/2, 104, 107, 108, 109, 103.3

[56] References Cited

U.S. PATENT DOCUMENTS

| | | | |
|---|---|---|---|
| 3,836,753 | 9/1974 | Pass | 235/449 |
| 3,961,371 | 6/1976 | Kobylarz et al. | 360/107 X |
| 4,788,420 | 11/1988 | Chang et al. | 235/449 X |
| 5,018,034 | 5/1991 | Tanaka et al. | 360/109 X |
| 5,091,811 | 2/1992 | Chang | 360/2 X |
| 5,128,524 | 7/1992 | Anglin et al. | 235/484 X |
| 5,196,680 | 3/1993 | Schuder | 235/449 |
| 5,256,867 | 10/1993 | Chen | 235/449 X |
| 5,266,789 | 11/1993 | Anglin et al. | 235/449 X |
| 5,270,523 | 12/1993 | Chang et al. | 235/449 |
| 5,321,243 | 6/1994 | Groves et al. | 235/483 X |
| 5,379,170 | 1/1995 | Schwarz | 360/109 |
| 5,426,286 | 6/1995 | Nair et al. | 235/449 |
| 5,466,920 | 11/1995 | Nair et al. | 235/449 |
| 5,491,327 | 2/1996 | Saroya | 235/449 |

FOREIGN PATENT DOCUMENTS 0087997  9/1983  European Pat. Off. .
6290530  10/1994  Japan .

*Primary Examiner*—Donald T. Hajec
*Assistant Examiner*—Michael G. Lee
*Attorney, Agent, or Firm*—Darby & Darby

[57] ABSTRACT

A magnetic card reader assembly includes a magnetic read head being biased into a guide slot. The guide slot is defined by a first side wall, a second bottom wall and a third side wall. The first side wall has an opening for receiving the magnetic read head. A U-shaped member has a first leg and a second leg. The first leg is integrally connected to the first side wall as one piece unitary member. A read head mounting frame is fixedly connected to the magnetic read head.

14 Claims, 5 Drawing Sheets

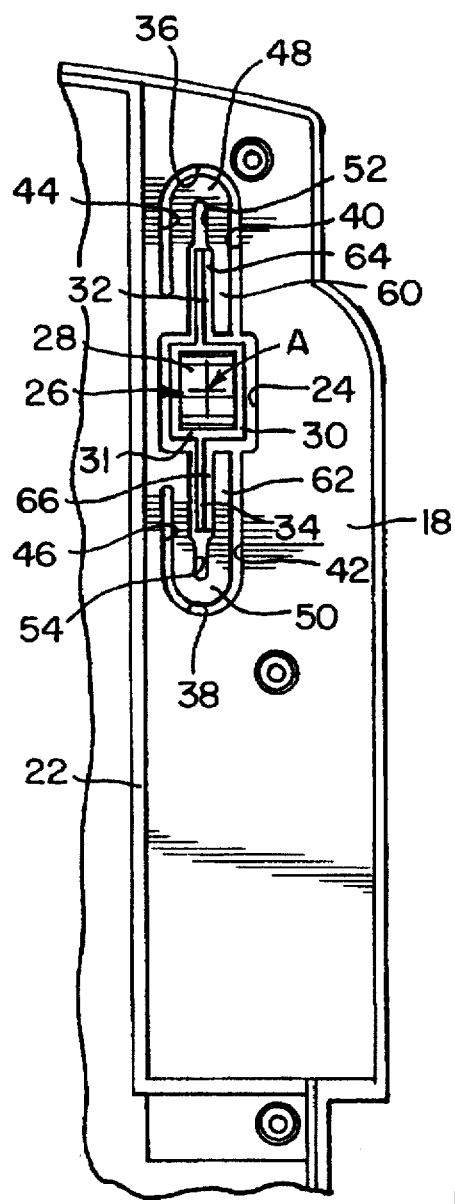
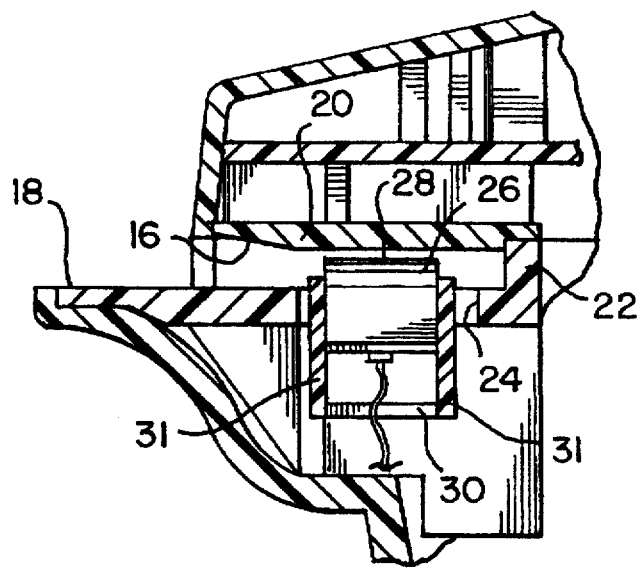
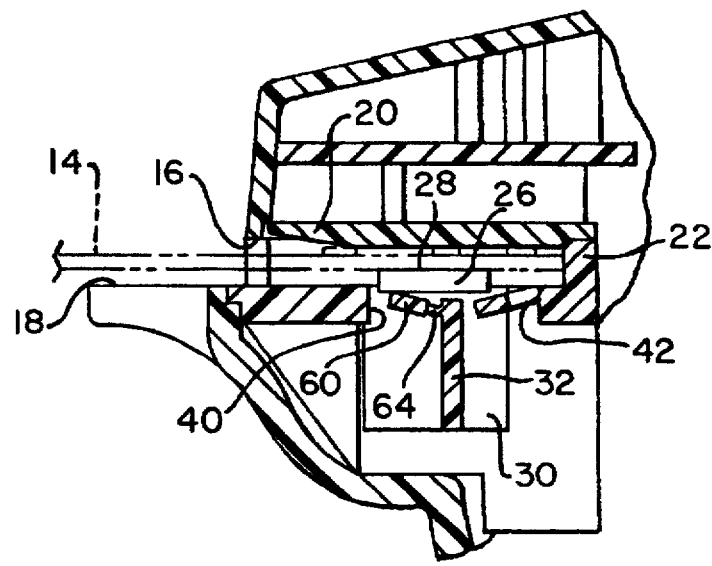

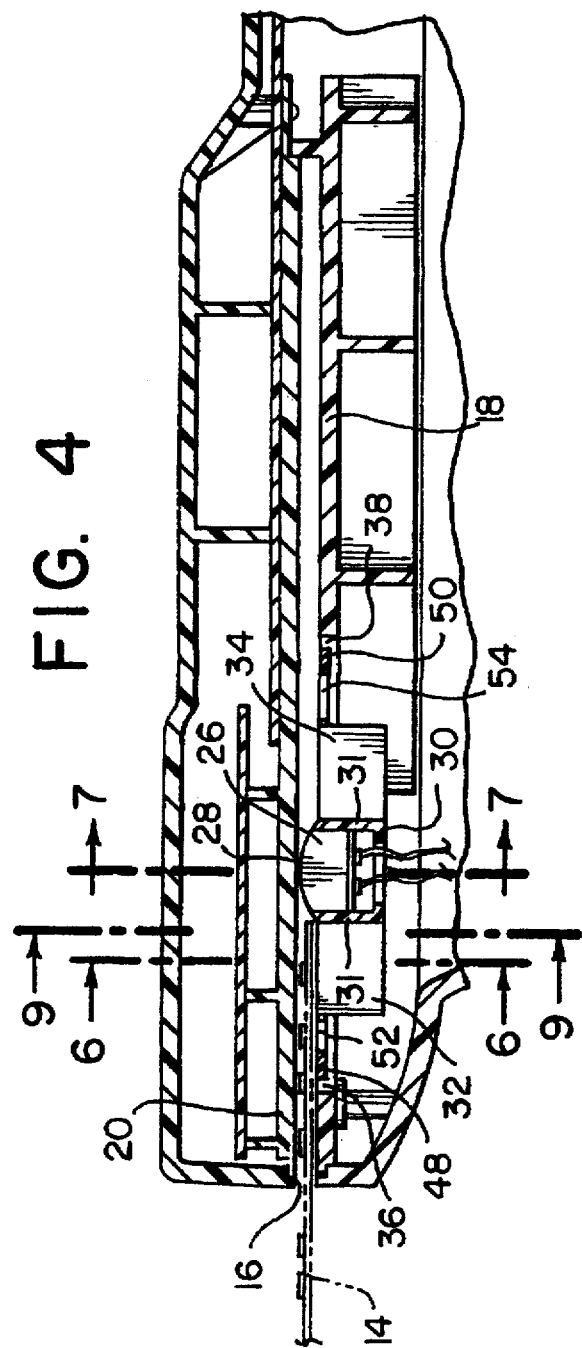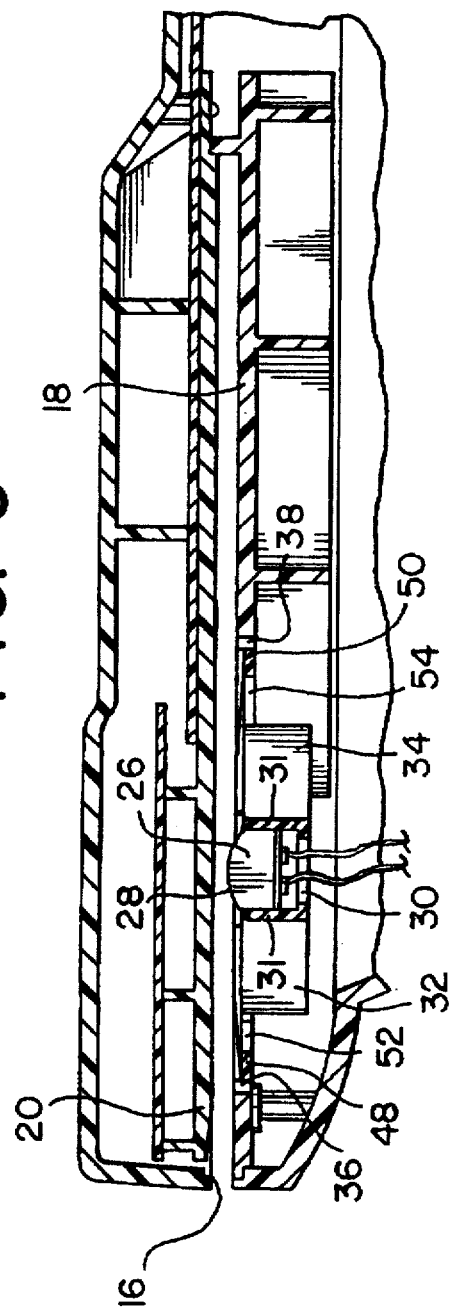

MAGNETIC CARD READER ASSEMBLY HAVING A FIRST MEMBER THAT HAS A FIRST LEG INTEGRALLY CONNECTED TO A SIDE WALL OF THE GUIDE SLOT

BACKGROUND OF THE INVENTION

1. Field of the Invention

The present invention relates to a magnetic reader assembly. More specifically, the present invention relates to a magnetic read head mounting arrangement.

2. Discussion of the Related Art

Magnetic card readers are known, for example, from U.S. Pat. No. 5,164,576 to Anglin et al. and U.S. Pat. No. 5,256,867 to Chen.

U.S. Pat. No. 5,164,576 discloses a magnetic card reading apparatus where the read head 30 is biased into the card slot 44 by a leaf spring 53.

U.S. Pat. No. 5,256,867 to Chen discloses a card reader apparatus that includes a mounting frame 32 which is selectively connected to a side wall 37 of the guide slot 44. The free ends 69, 70 of spring arms 67, 68 are utilized to bias a lead head 30 into the card slot. Mounting frame 32 is selectively connected to the side wall 37 so that head 30 will be aligned with one of two tracks on the data carrier. In another embodiment illustrated in FIGS. 14-16, a mounting frame 102 is selectively connected to side wall 111. Mounting frame 102 includes a spring member 210 that has a free end 126 which acts as a head contacting element to bias the rear surface of read head 103 into the guide slot. The spring head member 126 has a tapered contact surface to allow for rotation of the read head with respect to the head member.

Notwithstanding the foregoing mounting arrangements for a read head, there are still major problems involved. To properly read the magnetic stripe on the data carrier, the read head must remain in contact with the magnetic stripe portion of the card for all card thicknesses and for the amount of warp that any individual card may have. Thus, the read head must be permitted to move in two degrees of movement; namely, translation along the X axis and rotation to a limited degree about the Z axis (see FIG. 2 for the reference X-Y-Z coordinate system). It is important that the head mounting assembly permit the read head to move to a certain extent with respect to these two degrees of freedom while simultaneously preventing movement of the read head in the other four degrees of freedom; namely rotation along the X axis, translation about the Z axis, rotation about the Y axis, and translation along the Y axis. It is, therefore, an object of the present invention to provide a magnetic card reader assembly that permits the read head to have limited movement along the two desired degrees of freedom while simultaneously preventing movement along the remaining four degrees of freedom.

It is a further object of the present invention to provide a magnetic card reader assembly that requires less parts, and, thus, is smaller and easier to manufacture. It is a further object of to provide a magnetic card reader assembly that can be molded all in line of draw, without requiring the use of undercuts that would require more costly side actions in the mold tooling. It is still a further object of the present invention, that the magnetic card reader apparatus be simple and cost effective to manufacture, yet reliable and efficient in use.

SUMMARY OF THE INVENTION

In accordance with the preferred embodiment, demonstrating further objects, features and advantage of the invention, a magnetic card reader assembly includes a magnetic read head and a guide slot that is defined by a first side wall, a second bottom wall and a third side wall. The first side wall has an opening for receiving the magnetic read head. A U-shaped member has a first leg and a second leg. The first leg being integrally connected to said first side wall. A read head mounting frame is fixedly connected to the magnetic read head.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 3 is a top plan view of a first side wall and a second bottom wall of the guide slot according to the present invention;

FIG. 4 is a sectional view taken along lines 4—4 of FIG. 1 looking in the direction of the arrows;

FIG. 5 is a sectional view similar to FIG. 4 with the magnetic card being inserted further into the guide slot;

FIG. 7 is a sectional view taken along lines 7—7 of FIG. 4;

FIG. 8 is a sectional view similar to FIG. 6 but with the magnetic card inserted past the read head.

DETAILED DESCRIPTION OF THE PRESENTLY PREFERRED EXEMPLARY EMBODIMENT

Figure 1:
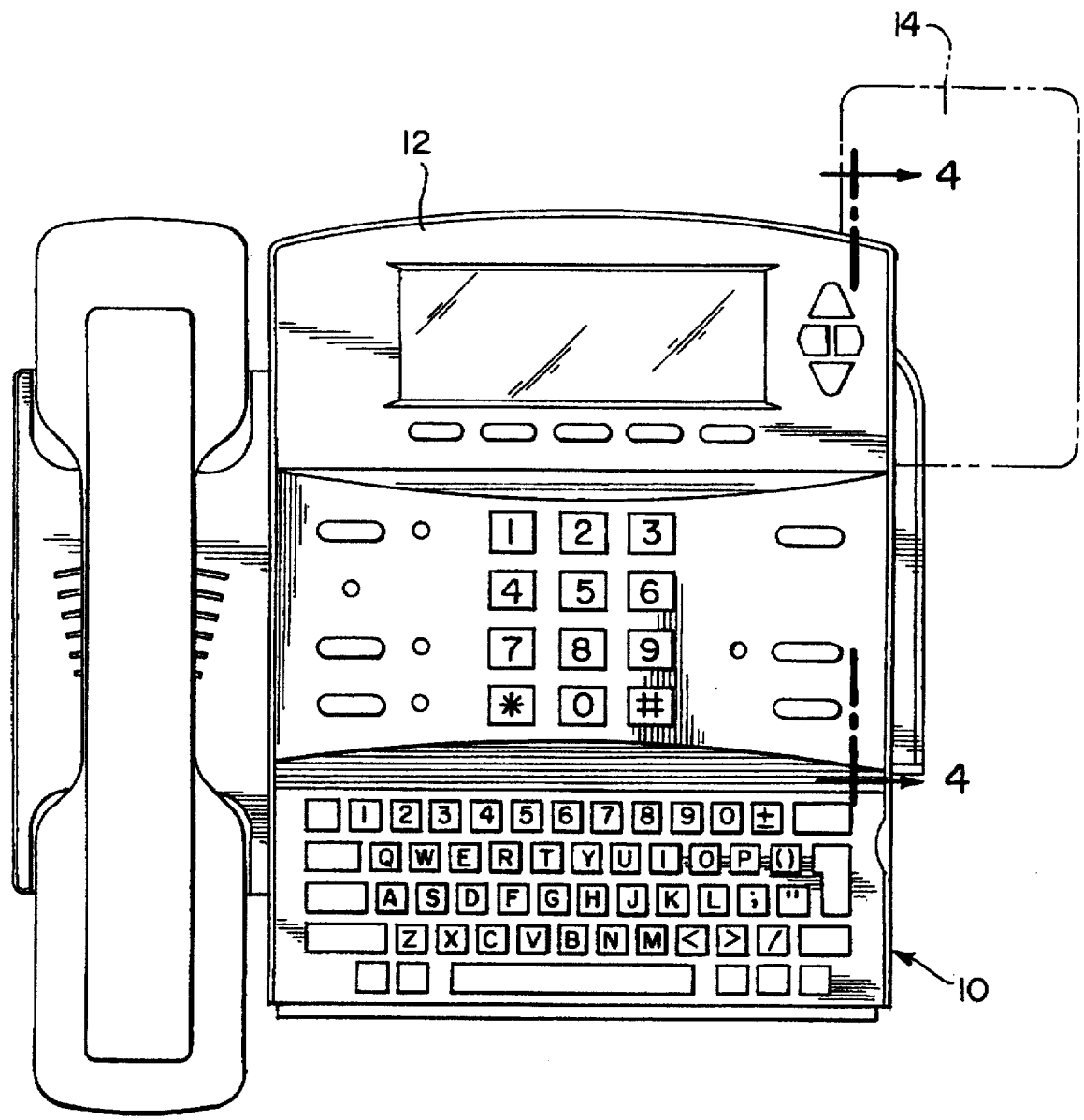
FIG. 1 is a top plan view of the magnetic card reader assembly being incorporated into a telephone.
Figure 2:
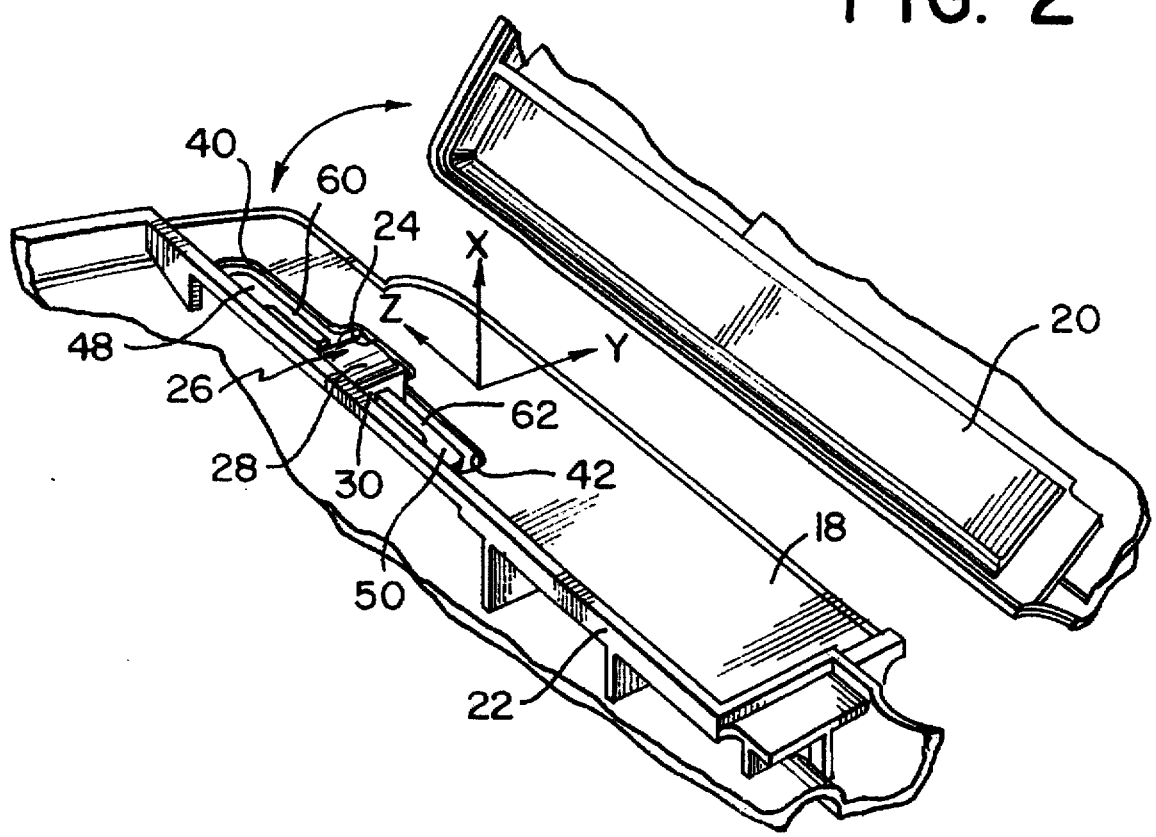
FIG. 2 is a perspective view of the magnetic card reader assembly, partially broken away and opened to present an internal view of the guide slot.

Referring now to FIG. 1, a magnetic card reading apparatus 10, being incorporated in a telephone 12, is illustrated. Of course, the magnetic card reader assembly 10 can be incorporated into a numerous point of sale transaction terminals including, for example, automatic teller machines, debit card readers, etc. Additionally, the assembly 10 can be used in other devices whenever it is desired to read information that has been stored on a magnetic stripe of a data carrier.

Figure 6:
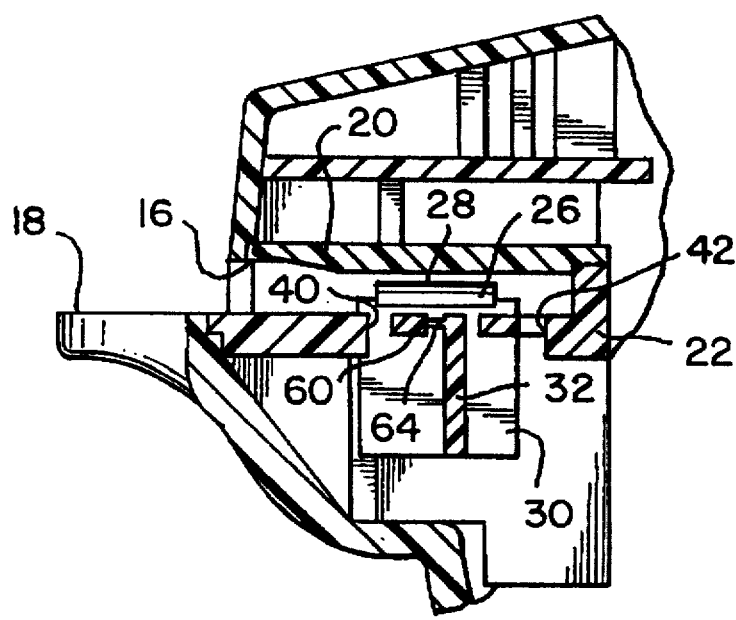
FIG. 6 is a sectional view taken along lines 6—6 of FIG. 4.
Figure 9:
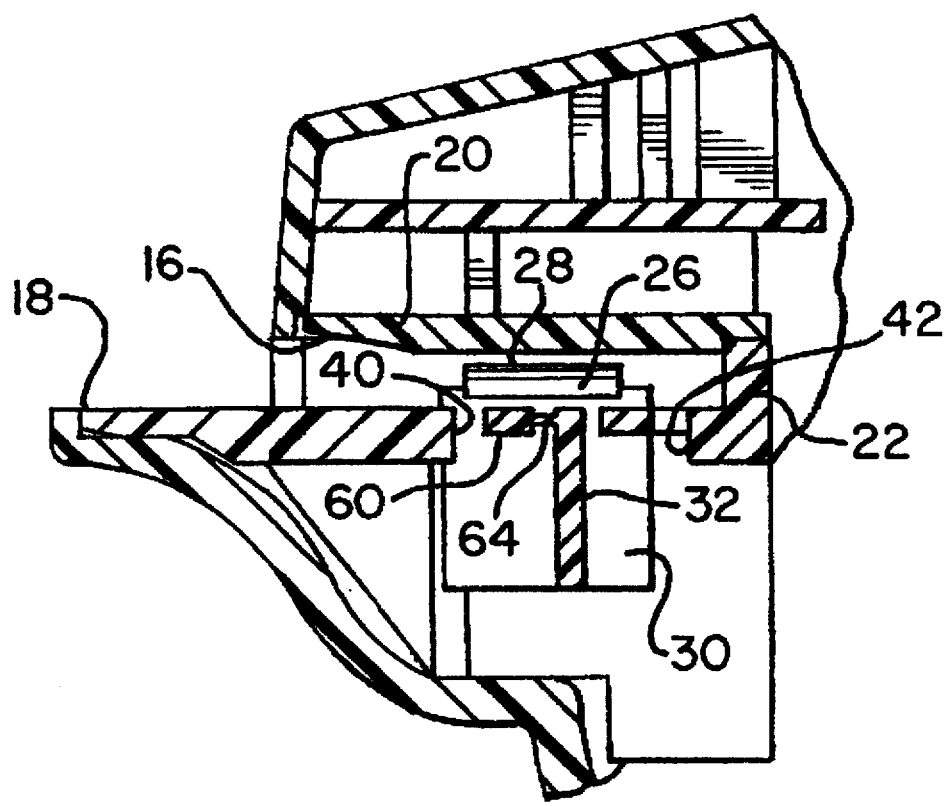
FIG. 9 is a sectional view taken along lines 9—9 of FIG. 4 and looking in the direction of the arrows.

The data carrier is a magnetic card 14, such as a conventional credit card that includes a magnetic stripe on one side thereof. The data carrier can also comprise any type of card that includes a magnetic stripe which can store information. The magnetic stripe contains at least one data track thereon. As shown in FIG. 6, the magnetic card reader assembly includes a guide slot 16. The slot is defined by a first side wall 18, second side wall 20 and a bottom wall 22. The first side wall 18 has a rectangular shaped opening 24 which receives a magnetic read head 26. The magnetic read head 26 is a transducer which reads the data stored on the magnetic stripe on the data carrier 14. The read head 26 has a front surface 28 which contacts the magnetic stripe of the data carrier 14 as it is swiped through the card guide slot 16.

As illustrated in FIG. 6, the bottom wall 22 and side wall 20 overlap and actually contact one another. However, the bottom wall 22 doesn't necessarily have to contact side wall 20, but each can be held in place by respective frames member and be held spaced apart from one another by a minimal extent which is less than the thickness of a conventional data carrier.

As shown in FIG. 7, the read head 26 is fixedly mounted within a read head mounting bracket 30. Bracket 30 is rectangular in shape and is configured to snugly fit around the sides of the read head 26. A pair of substantially planar walls 32, 34 extend in opposite directions from two of the side walls 31 of the mounting bracket 30. A pair of U-shaped slots 35, 38 are disposed in a side wall 18. Each slot 35, 38 has one leg 40, 42, respectively, which is open to the opening 24 in the first side wall 18. The other leg 44, 46 of U-shaped slots 35, 38, respectively, is closed. A central slot 52, 54 is disposed between the legs 40, 44 and 42, 45, respectively to define a first U-shaped portion 48 of side wall 18 and a second U-shaped portion 50 of side wall 18, which is also defined by slots 35, 38, respectively. The U-shaped portions 48, 50 of the first side wall 18 are preferably molded together along with the bottom wall 22 as a one piece construction. The second side wall 20 can then be fixedly connected to the first side wall 18 and bottom wall 20 to form the guide slot 16, for example, by a threaded fastener. Of course, side wall 20 could be integrally molded second side wall 18 and bottom wall 20 as a one piece construction, if desired. A first leg integrally connects a U-shaped leg 48 of the first side wall 18 and a second leg 58 integrally connects the second U-shaped portion 50 with the first side wall 18 as a unitary member.

A second leg 60 of the first U-shaped portion 48 and the second leg 62 of the second U-shaped portion 50 are each integrally connected to planar walls 32, 34, respectively, by a living hinge 64, 66, respectively, as shown in FIGS. 3 and 8. The living hinge 64, 66 each have a center line which substantially bisects the head contact surface 28 at point A, as illustrated in FIG. 3. In some embodiments the head contact surface does not extend all the way across the head. In such cases, it is still desirable to have the living hinge center line bisect the head contact surface. The living hinge is preferably made of polypropelene, but could be made of other flexible materials, such as other thermoplastics, so long as the living hinge material will last for the design life of the reader assembly.

By this construction, the read head 26 is permitted to be biased along the X axis and about the Z axis to ensure that the read head is maintained continuously in contact with the magnetic stripe of the data carrier 14 as the carrier 14 is swiped through the guide slot 16. In other words, this configuration permits the read head 26 to translate along the X axis and rotate about the Z axis, while simultaneously substantially preventing a rotation about the X axis, translation along the Z axis, translation along the Y axis and rotation about the Y axis. The biasing force applied by this construction is designed to be strong enough to maintain the head in contact with the card as it is swiped while accounting for all variations in card dimension as well as potential allowable warpage of the cards, while at the same time being minimized to reduce head and card wear. Of course, one of ordinary skill in the art would readily recognize the preferred amount biasing force that is necessary to achieve these objectives. In addition, this configuration is designed so that the read head is mounted so that it aligns with the correct track on the card. Typically, there are two tracks on a data carrier. In the current configuration, the head is designed to read only track 2 of the data carrier. Of course, the read head could be configured to read track 1 of the data carrier. An advantage of the construction of the present invention, is that bottom wall 22 and left side wall 18 can be molded as a one piece construction, this one piece construction includes the mounting bracket 30 for the read head, which is unitarily connected to side wall 18 by a living hinge. Once molded, the read head 26 is simple fixedly mounted within the mounting bracket 30 in a position such that the card reading surface of the read head is disposed either just in contact with or spaced by a predetermined minimum distance from the opposite side wall 20 to ensure that even the minimally dimensioned thickness size data carrier 14 will always be in contact with the read head contact surface 28 as the carrier 14 is swiped through the guide slot.

Having described the presently preferred exemplary embodiment of a new and improved magnetic card reader assembly, in accordance with the present invention, it is believed that other modifications, variations and changes will be suggested to those skilled in the art in view of the teachings set forth herein. For example, U-shaped portions 48, 50 of the side wall 18 could be configured in other shapes, such as an elongated linear strip for example, so long as the strips or whatever other shape is used maintain a biasing force upon the read head mounting bracket into the guide slot (i.e., in the X direction). It is, therefore, to be understood that all such modifications, variations, and changes are believed to fall within the scope of the present invention as defined by the appended claims.

I claim:

1. A magnetic reader assembly comprising:

a magnetic read head;

a guide slot being defined by a first side wall, a second bottom wall and a third side wall, said first side wall having an opening for receiving said magnetic read head;

a U-shaped first member having a first leg and a second leg, said first leg being integrally connected to said first side wall as one piece unitary member;

a read head mounting frame being fixedly connected to said magnetic read head, said read head mounting frame being pivotally connected to said second leg of said U-shaped member.

2. The assembly according to claim 1, wherein said pivotal connection between said read head mounting frame and said second leg is a living hinge.

3. The assembly according to claim 2, wherein said second leg of said first U-shaped member and said read head mounting frame are integrally connected together as a one piece unitary member, said living hinge has a greater flexibility as compared to said read head mounting frame and said second leg.

4. The assembly according to claim 3, wherein said living hinge has a longitudinal axis, said read head has a contact surface, said living hinge longitudinal axis substantially bisects said read head contact surface.

5. The assembly according to claim 1, further comprising a second member having a first leg and a second leg, said first leg being integrally connected to said first side wall as a one piece unitary member.

6. The assembly according to claim 5, wherein said second member is U-shaped.

7. The assembly according to claim 6, wherein said read head mounting frame is pivotally connected to said second leg of said second U-shaped member.

8. The assembly according to claim 7, wherein said pivotal connection between said read head mounting frame and said second leg of said second U-shaped member is a living hinge.

9. The assembly according to claim 8, wherein said second leg of said second U-shaped member and said read head mounting frame are integrally connected together as a one piece unitary member, said living hinge is a reduced thickness as compared to said read head mounting frame and said second leg of said second U-shaped member.

10. The assembly according to claim 9, wherein said living hinge has a longitudinal axis, said living hinge longitudinal axis substantially bisects said read head contact surface.

11. A magnetic reader assembly comprising:

a magnetic read head;

a guide slot being defined by a first side wall, a second bottom wall and a third side wall, said first side wall having an opening for receiving said magnetic read head;

a first U-shaped member having a first leg and a second leg, said first leg being integrally connected to said first side wall as one piece unitary member;

a second U-shaped member having a first leg and a second leg, said first leg being integrally connected to said first side wall as one piece unitary member; and a read head mounting frame being fixedly connected to said magnetic read head, said read head mounting frame being pivotally connected to said second leg of said first and second U-shaped member.

12. The assembly according to claim 11, wherein said pivotal connection between said read head mounting frame and said second leg of said first and second U-shaped member is a living hinge.

13. The assembly according to claim 12, wherein said second leg of said first and second U-shaped member and said read head mounting frame are integrally connected together as a one piece unitary member, said living hinge is a reduced thickness as compared to said read head mounting frame and said second leg of said first and second U-shaped member.

14. The assembly according to claim 11, wherein said living hinge has a longitudinal axis, said read head has a contact surface, said living hinge longitudinal axis substantially bisects said read head contact surface.

* * * * *